Aug. 24, 1965    G. P. RICHARDS    3,202,161
ENGINE SAFETY CONTROL DEVICE AND SYSTEM
Filed Nov. 14, 1961    2 Sheets-Sheet 2
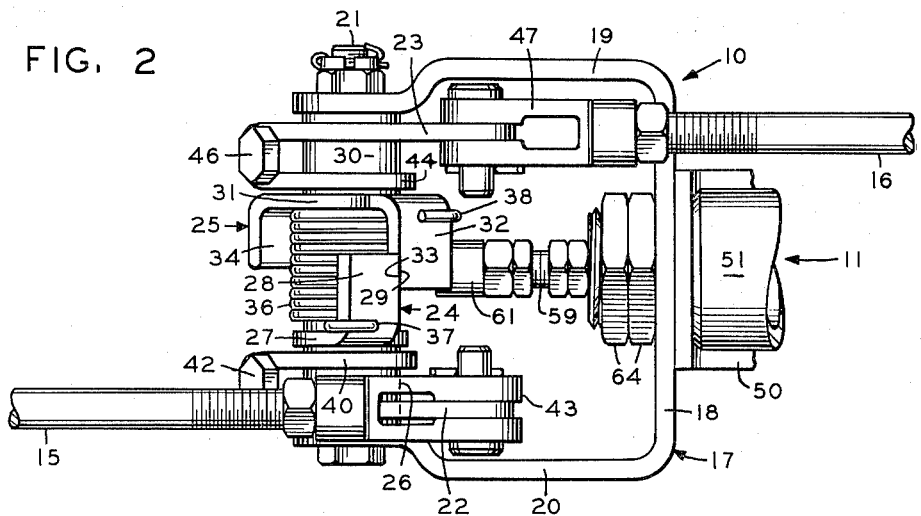
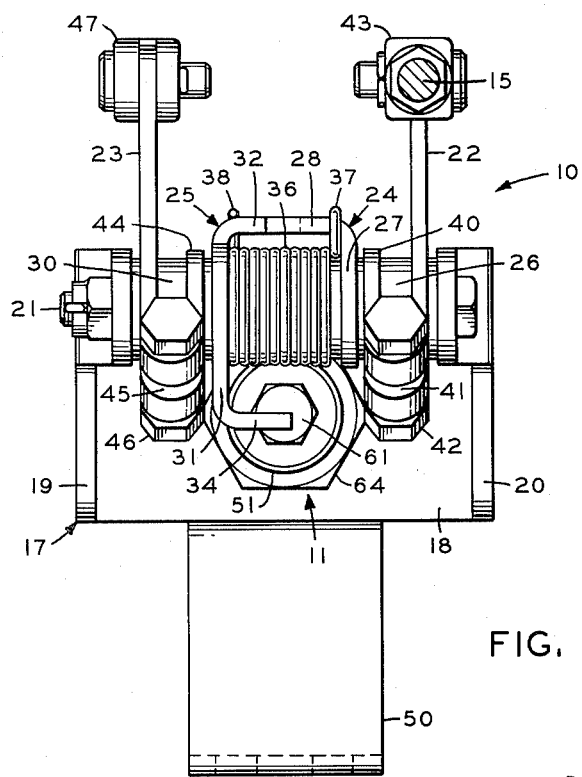
INVENTOR
GRAHAME P. RICHARDS
BY *Gravely, Lieder & Woodruff*
ATTORNEYS

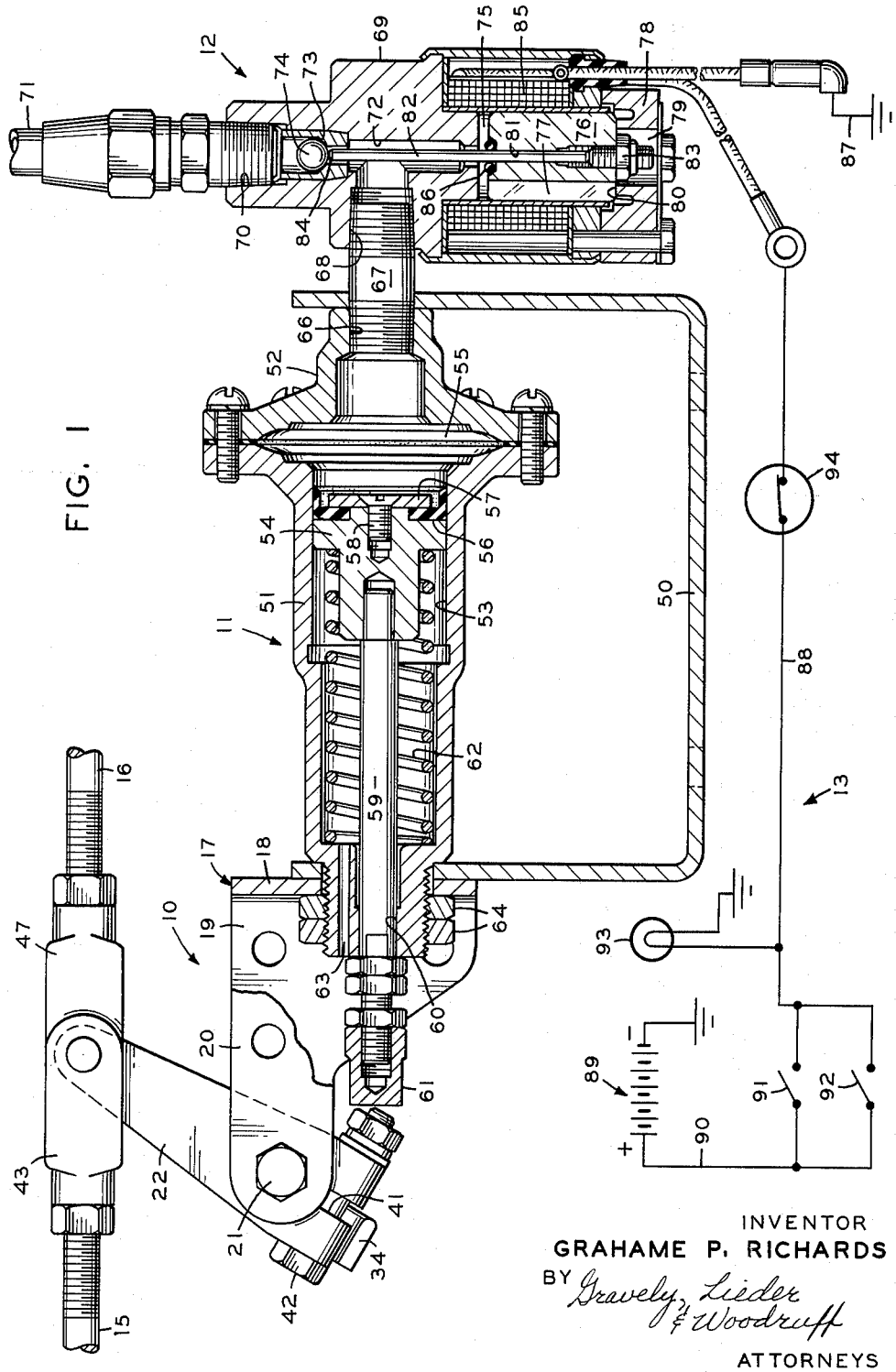

3,202,161
ENGINE SAFETY CONTROL DEVICE AND SYSTEM

Grahame P. Richards, St. John, Mo., assignor to Wagner Electric Corporation, St. Louis, Mo., a corporation of Delaware
Filed Nov. 14, 1961, Ser. No. 152,311
5 Claims. (Cl. 137—18)

This invention relates generally to safety devices for motor vehicles, and particularly to over-rule mechanisms responsive to predetermined sub-standard engine conditions for automatically disabling operator controls.

The principal object of the present invention is to prevent operation of a vehicle engine over idle speeds in the event of sub-normal conditions of the engine, such as loss of lubricating oil or overheating of the coolant.

Another object of the invention is to disable operator controls to prevent normal engine operation, while permitting the engine to operate at idle speeds whereby the vehicle can be moved at slow speeds if necessary.

Another object is to provide a safety device and system for a vehicle throttle linkage to produce an idle operation of the vehicle engine in response to overheating or loss of lubrication for permitting slow operation of the vehicle, and having means for permitting deliberate disabling of the safety device controls under emergency road conditions or the like.

A still further object is to provide a safety device that is positive acting in operation, yet simple in construction.

These and still other objects and advantages will become more apparent hereinafter.

Briefly, the invention is embodied in a safety device interposed between accelerator and throttle rods for a vehicle engine, and including relatively rotatable first and second members connected to the rods, means yieldably connecting the members for concert movement between idle and throttle positions, and means responsive to a predetermined sub-normal engine condition for positioning one of the members in its idle position.

The invention also consists in the parts and in the combinations and arrangements of parts hereinafter described and claimed.

In the accompanying drawings which form a part of this specification and wherein like numerals refer to like parts wherever they occur;

FIG. 1 is a side elevational view of a safety device, partly broken away, with operating control portions shown in section and the system therefor shown diagrammatically, FIG. 2 is a top plan view of the safety device, and FIG. 3 is an end elevational view of the safety device.

Referring to FIG. 1 of the drawings, it will be seen that the invention is embodied in a safety control device 10 operatively associated with an air cylinder 11 controlled by a solenoid valve 12 adapted to be actuated by an electrical circuit or system 13.

The safety control device 10, FIGS. 1, 2 and 3, comprises an over-rule mechanism incorporated in the throttle or governor linkage between the engine and operating controls (not shown) of a tractor-trailer combination or like vehicle (not shown). A typical throttle linkage includes an accelerator rod 15 connected between a tractor accelerator pedal (not shown) and the control device 10, and a throttle rod 16 connecting the control device 10 with the throttle assembly (not shown) of the tractor engine (not shown). The tractor assemblies that are not shown in the drawings form no part of the present invention and are not believed essential to a complete understanding thereof.

The safety control device 10 has a U-shaped mounting bracket 17 having a base wall 18 and opposed side walls 19 and 20, and a hinge pin 21 is secured between the side walls 19 and 20 across the free end portions thereof. The control device 10 is journaled on a suitable bearing sleeve (not shown) carried on the hinge pin 21 for free swinging movement in the direction of reciprocation of the accelerator and throttle rods 15 and 16. This reciprocation is, of course, limited by the requirements of the throttle assembly and accelerator between an idle position as shown in FIG. 1 and a full throttle position produced by movement of the rods 15 and 16 to the left in FIG. 1.

The safety control device 10 comprises first and second members including accelerator and throttle rod arms 22 and 23 of similar construction, and first and second abutment or stop members 24 and 25. The first abutment member or element 24 includes a sleeve portion 26 and a right angle lug 27 extending radially from intermediate the ends of the sleeve 26 with an axial tab portion 28 having an abutment surface 29. The second abutment member or element 25 is similar to the first abutment member 24 and includes a sleeve portion 30 and a right angle lug 31 extending radially from intermediate the ends of the sleeve 30 with an axial tab portion 32 having an abutment surface 33. The lug 31 also has a lower lug member 34 spaced from the sleeve on the side opposite to the tab 32, the lug member 34 forming contact or target means for engagement by the air cylinder ram during safety operation of the device 10, as will be described more fully hereinafter. The first and second abutment members 24 and 25 are arranged axially on the bearing of the hinge pin 21 with the sleeve portions 26 and 30 in abutting relation and the axial tabs 28 and 32 extending in an axially overlapping relationship. A spring member 36 is positioned around the adjacent sleeve portions 26 and 30 between the lugs 27 and 31, and has end hooks 37 and 38 engaged on the tabs 28 and 32 to exert a force maintaining the abutment or stop surfaces 29 and 33 in contact for concert movement of the first and second members during normal operation of the vehicle.

The accelerator arm 22 is received on the outer sleeve portion 26 of the first abutment member 24, the arm 22 having a reverse bend 40 and being split, at 41, to form compressible means receiving a fastener 42 for adjustably securing the arm 22 in fixed position on the abutment member 24. A shackle coupler 43 pivotally mounts the accelerator rod 15 on the outer end of the arm 22.

The throttle arm 23, being similar to the accelerator arm 22, has a reverse bend 44, split at 45, and adjustably secured on the outer sleeve portion 30 of the second abutment member 25 by fastening means 46. A shackle type coupler 47 pivotally secures the throttle rod 16 on the outer end of the throttle arm 23.

It will be readily apparent that the first member, including the arm 22 and abutment element 24, and the second member, including the arm 23 and abutment element 25, of the safety device 10 are mounted in assembled position on the hinge pin 21 between the bracket walls 19 and 20 for rotation on this fixed axis. The direction of actuation of the accelerator rod 15 from an idle position (or to the left in FIG. 1) transversely of the axis of rotation 21 rotates the arm 22 and element 24 in a direction (counterclockwise) tending to cause separation or relative movement between the contact tabs 28 and 32, but the force exerted by the spring 36 biasing the tabs into abutment is sufficient to overcome the inherent resistances in the accelerator-throttle linkage and, in normal operation, provides concert rotation (counterclockwise) of the first and second members of the safety device 10. However, it is also apparent that the contact lug 34 is adapted to be contacted by the air cylinder ram and moved to the idle position of the second member whereby actuation of the accelerator rod 15 will overcome the spring 36 and cause relative rotation between the first and second members of the safety device 10.

Referring again particularly to FIG. 1, the air cylinder 11 and valve 12 for operating the safety control device 10 are mounted on a bracket 50 adapted to be secured in a convenient location on the vehicle for interposing the safety device in the throttle linkage, as stated. The air cylinder 11 has a housing 51 with a closure cap 52 sealably secured thereto, the housing 51 having a cylinder bore 53 in which a piston 54 is slidably mounted. The closure cap 52 and housing 51 define an air inlet chamber 55 in communication with the head of the piston 54, which has a sealing cup 56 secured thereto by a retainer plate 57 and fastener 58. A piston rod 59 extends through an end bore 60 in the housing 51, and an abutment cap or ram member 61 is adjustably secured on the end of the piston rod 59. A return spring 62 is provided in the chamber between the piston 53 and the outlet end of the housing 51 for biasing the piston 53 to its normally inoperative position, as shown in FIG. 1. The outlet end chamber of the housing 51 is also vented to atmosphere by a port 63. It will be noted that the mounting brackets 17 and 50 are secured on the outlet end of the housing 51 by suitable fastening nuts 64 to position the safety control device 10 in predetermined alignment with the axial movement of the piston rod 59 and abutment cap 61 whereby the lug 34 of the device 10 will be contacted. The axial limit of piston travel relative to the arc through which the lug 34 is adapted to travel is also predetermined so that that lug will be contacted at any time the air cylinder 11 is energized.

The closure cap 52 of the air cylinder 11 has an inlet port 66 in communication with the inlet chamber 55, and a threaded nipple 67 is connected between the port 66 of the air cylinder cap 52 and an outlet port 68 formed in the housing 69 of the solenoid valve 12.

The valve housing 69 has an inlet port 70 connected by a conduit 71 to a source of air pressure, such as the tractor reservoir tank (not shown) in the pneumatic system of the tractor. An inlet and exhaust chamber 72 is formed between the inlet port 70 and the outlet port 68. A valve seat 73 is provided at the inlet port 70, and an inlet valve member 74 is normally engaged on the seat 73 to prevent pressure fluid communication between the inlet and outlet ports 70 and 68 through the inlet and exhaust chamber 72. It will be noted that the valve housing 69 is arranged vertically with the inlet valve 74 in the upper portion. A plunger chamber 75 is provided in the lower portion of the housing 69 and a plunger 76 is slidably positioned in the chamber 75 and has vertical passages 77 formed between its upper and lower ends. The lower end of the housing 69 has a closure plug 78 with a centrally formed exhaust port 79, which is normally in communication with the inlet and exhaust chamber 72 through the plunger chamber 75 and passages 77. The plunger 76 is normally disposed on an annular stop 80 formed on the plug 78 around the exhaust port 79. The plunger 76 has an axial bore 81 in which a valve control rod 82 is adjustably positioned by an adjustment member 83 threaded in the lower end of the bore 81. The upper end 84 of the rod 82 is positioned in juxtaposition with the valve member 74. A solenoid coil 85 is provided in the housing 69 in position to actuate the plunger 76 upwardly during operation of the safety system, as will be further described. The plunger 76 also carries an annular seal 86 on its upper end in position to seat against a shoulder of the housing 69 to isolate the plunger chamber 75 and exhaust port 79 from the inlet and exhaust chamber 72 when the plunger 76 is actuated to unseat the valve 74.

The coil 85 has a lead 87 to ground and a lead 88 connected to the electrical circuit 13, which is preferably connected in the tractor electrical system (designated as a source of electric energy at 89) by a lead 90. The safety device electric circuit 13 includes a pair of sending units or switches 91 and 92 connected in parallel between the leads 90 and 88. The switches 91 and 92 are normally open and the closing of either will complete the circuit between the source of energy 89 and the solenoid coil 85 to actuate the safety device system. The normally open switch 91 may be a pressure switch of conventional construction interposed in the engine lubricating oil pressure supply (not shown) and being closed in response to a predetermined low pressure therein. The normally open switch 92 may be a temperature responsive switch in the engine cooling system (not shown) and being responsive to a predetermined high temperature of the engine coolant. It will be apparent that either or both of these switches or other means indicating sub-normal engine operating conditions may be employed in the circuit 13. The circuit 13 may also include a warning light 93 positioned in the operator's cab of the tractor to indicate that loss of operator control of the engine speed through the accelerator-throttle linkage is due to below normal engine conditions effecting operation of the safety device 10. A sealed normally closed over-ride switch 94 may be interposed in the lead 88, which switch is also positioned in the operator's cab to provide the operator with positive means for disabling the safety device 10 in an emergency situation.

In normal engine operation the pressure and temperature switches 91 and 92 are open, and the air cylinder inlet chamber 55 is vented to atmosphere through the nipple 67, inlet and exhaust chamber 72, plunger chamber 75 and exhaust port 79 whereby the piston 54 is in its inoperative position. Movement of the operator control or accelerator rod 15 to rotate the first or accelerator member 22, 24 of the safety device 10 from the idle position shown in FIG. 1, is transmitted through the spring 36 to the second or throttle member 23, 25 to effect concert rotation thereof and move the throttle rod 16 to open the throttle from its idle position.

In the event a sub-normal engine condition should occur due to an increase in coolant temperature or drop in the engine oil pressure, the switch 92 or 91 would close to energize the solenoid coil 85 whereby the plunger 76 would be moved upwardly to close off the exhaust passage from the chamber 72 and unseat the valve member 74 so that pressure fluid would flow through the solenoid valve 12 and nipple 67 into the inlet chamber 55 of the air cylinder 11 and act on the effective area of the piston 54. The piston 54 and piston rod 59 are thus moved outwardly to an operative position, the abutment cap 61 being moved into contact with the lower throttle member lug 34 to rotate the second or throttle member 23, 25 of the safety devices 10 relative to the first or accelerator member 22, 24 thereby overcoming the force of the spring 36 and moving the throttle rod 16 to idle position. The operator accelerator control is thereby ineffective to operate the engine throttle mechanism.

When coolant operating temperature or lubricant pressure returns to a preset normal condition, the switch 92 or 91 will open to de-energize the solenoid coil 85 whereby the plunger 76 will fall by gravity to seat the valve 74 and open the exhaust passage through the valve 12 whereby the piston 54 and piston rod 59 will be returned to inoperative position by the return spring 62. The safety device 10 is thus rendered inoperative and normal engine control will be returned to the operator.

It will be appearent that the present safety device and system will be operative not only when sub-normal engine conditions prevail during operation of the vehicle, but will also be effective to prevent operation of a cold engine above idle speed until the oil passages are filled and safe operating oil pressure built up.

The invention is intended to cover all changes and modifications of the embodiment disclosed herein that will be obvious to one skilled in the art, and the invention is limited only by the claims which follow.

What is claimed is:

1. In a vehicle engine including fuel feeding means having throttle valve means for controlling the rate of fuel feed and being movable between an idle position of minimum feed and a throttle position increasing the flow rate for engine acceleration, and manual accelerator means for operating said throttle valve means and including an engine throttle linkage having accelerator and throttle rods; the combination of a safety device interposed between said accelerator and throttle rods comprising a first member having an abutment member and an accelerator rod arm secured together, a second member having an abutment member and a throttle rod arm secured together, said first and second members being mounted on a common pivot pin and being adapted for relative rotation, said abutment members having tab means extending in an axially overlapping relationship, means yieldably interconnecting said first and second members for normally providing concert movement therebetween, said accelerator and throttle rods being pivotally connected to the respective arm therefor whereby concert movement is normally provided therebetween, said abutment member of said second member having a contact lug, and normally inoperative means responsive to a predetermined sub-normal engine condition for engagement with said contact lug to position said second member, throttle rod and throttle valve in said idle position.

2. In a vehicle engine including fuel feeding means having throttle valve means for controlling the rate of fuel feed and being movable between an idle position of minimum feed and a throttle position increasing the flow rate for engine acceleration, and manual accelerator means for operating said throttle valve means and including an engine throttle linkage having accelerator and throttle rods; the combination of a safety device interposed between said accelerator and throttle rods comprising relatively rotatable first and second members to which said accelerator and throttle rods, respectively, are connected, means yieldably connecting said first and second members for normally providing concert movement of said members and rods between said idle and throttle positions, said system also including a normally inoperative air cylinder having piston ram means adapted for movement to engage said second member to effect the idle position thereof, and means for actuating said piston ram means including a solenoid coil and normally open switch means associated with a vehicle engine and adapted to be closed to energize said solenoid coil.

3. The safety control system according to claim 2 in which said normally open switch means comprises a pressure switch connected in the lubricating oil system of the vehicle engine and being closed in response to a predetermined low oil pressure.

4. The safety control system according to claim 2 in which said normally open switch means comprises a temperature switch connected in the cooling fluid system of the vehicle engine and being closed in response to a predetermined high cooling fluid temperature.

5. The safety control system according to claim 2 in which sealed normally closed switch means is interposed in said actuating means between said solenoid coil of said actuating means for actuating said piston ram means and said normally open switch means, said sealed switch means being adapted to be manually opened for disabling said electrical means.

References Cited by the Examiner
UNITED STATES PATENTS

| | | | |
|---|---|---|---|
| 1,925,987 | 9/33 | King et al. | 123—198 |
| 1,968,828 | 8/34 | Hardison | 123—198 |
| 2,177,537 | 10/39 | Sloan | 251—77 |
| 2,208,299 | 7/40 | Marcus | 123—198 |
| 2,224,600 | 12/40 | Howard | 123—103 |
| 2,260,576 | 10/41 | Maybach | 123—103 |
| 2,294,152 | 8/42 | Yates et al. | 123—198 |
| 2,295,147 | 9/42 | Weydell | 123—102 |
| 2,361,206 | 10/44 | Hoppe | 123—103 |
| 2,423,728 | 7/47 | Ray | 123—198 |
| 2,565,984 | 8/51 | Newman et al. | 123—198 |
| 2,699,161 | 1/55 | Pees | 123—198 |
| 2,731,001 | 1/56 | Dickson et al. | 123—198 |
| 2,910,974 | 11/59 | Caris | 123—103 |
| 2,945,547 | 7/60 | Bunker | 123—103 |

ISADOR WEIL, *Primary Examiner.*
RICHARD B. WILKINSON, *Examiner.*